INVENTOR.
RUDOLPH M. DURIS
BY Eyre, Mann & Lucas
ATTORNEYS

June 27, 1967 R. M. DURIS 3,327,824
CLOCK SYSTEM
Original Filed June 16, 1964 2 Sheets—Sheet 2

INVENTOR.
RUDOLPH M. DURIS
BY Eyre, Mann & Lucas
ATTORNEYS

United States Patent Office 3,327,824
Patented June 27, 1967

3,327,824
CLOCK SYSTEM
Rudolph M. Duris, South Norwalk, Conn., assignor to Edwards Company, Inc., a corporation of Connecticut
Original application June 16, 1964, Ser. No. 375,492, now Patent No. 3,282,043, dated Nov. 1, 1966. Divided and this application Apr. 12, 1966, Ser. No. 559,022
4 Claims. (Cl. 192—84)

This application is a division of copending application, Ser. No. 375,492, filed June 16, 1964, now U.S. Patent No. 3,282,043.

The present invention relates to systems of electric clocks employing synchronous motors and more particularly, to such systems in which the electric clocks are automatically reset after there has been an electric power interruption.

In accordance with the present invention, a unique downtime accumulator is provided which measures the length of time of an electric power interruption and resets the electric clocks of the system to the correct time when the electric power returns. This downtime accumulator includes two cams with a mechanical clock movement drive and a synchronous motor drive. When there is a power interruption, the mechanical clock movement drive is coupled to the cams by an electromagnetic clutch to rotate the cams so that the cams' orientation at all times represent the amount of time the electric clocks are in error due to the interruption of electrical power. When power is returned after the interruption, the electromagnetic clutch disconnects the synchronous motor drive to the cams. At the same time, electric current is fed through switch means controlled by the cams to the synchronous motor drive and to a synchronous motor in each of the electric clocks of the system. This causes the synchronous motor drive to rotate the cams toward their orientation when the electrical power failed and causes the mentioned synchronous motor in each electric clock to correct the error which accumulated during the power interruption. When the cams reach their orientation at the start of the power failure, the electric clocks again indicate the correct time and the cams open up the switch to stop the electric current flow to the synchronous motor drive and to the mentioned synchronous motor in each electric clock.

Of particular importance in obtaining accurate operation of the above described downtime accumulator is the unusual electromagnetic clutch employed in transferring the drive for the cams from the output of the mechanical clock mechanism to the output of the synchronous motor. This clutch has one plate with a number of closely spaced radial grooves which by energizing and deenergizing the clutch are contacted with and seperated from a number of soft rubber sleeves, mounted on arms extending from a second plate. It has been found that this arrangement does not permit slippage between the two plates while transmitting motion to the cams, and there is no tendency for either of the plates to cause the other plate to jump upon engagement.

In the preferred embodiment, the clock system has a master clock. Like the other clocks in the system the master clock is normally driven by a synchronous motor. However, unlike the other clocks in the system, when the power fails the master clock is driven by the mechanical clock movement so that at all times the hands of the master clock will indicate the correct time. This is accomplished with additional electromagnetic clutches of the type described above, which change the drive for the master clock from the synchronous motor to the mechanical clock movement when there is a power interruption and then return the drive for the clock to the synchronous motor when power is resumed.

These and other features of the present invention may be best understood by reference to the accompanying drawings of which:

Figure 1:
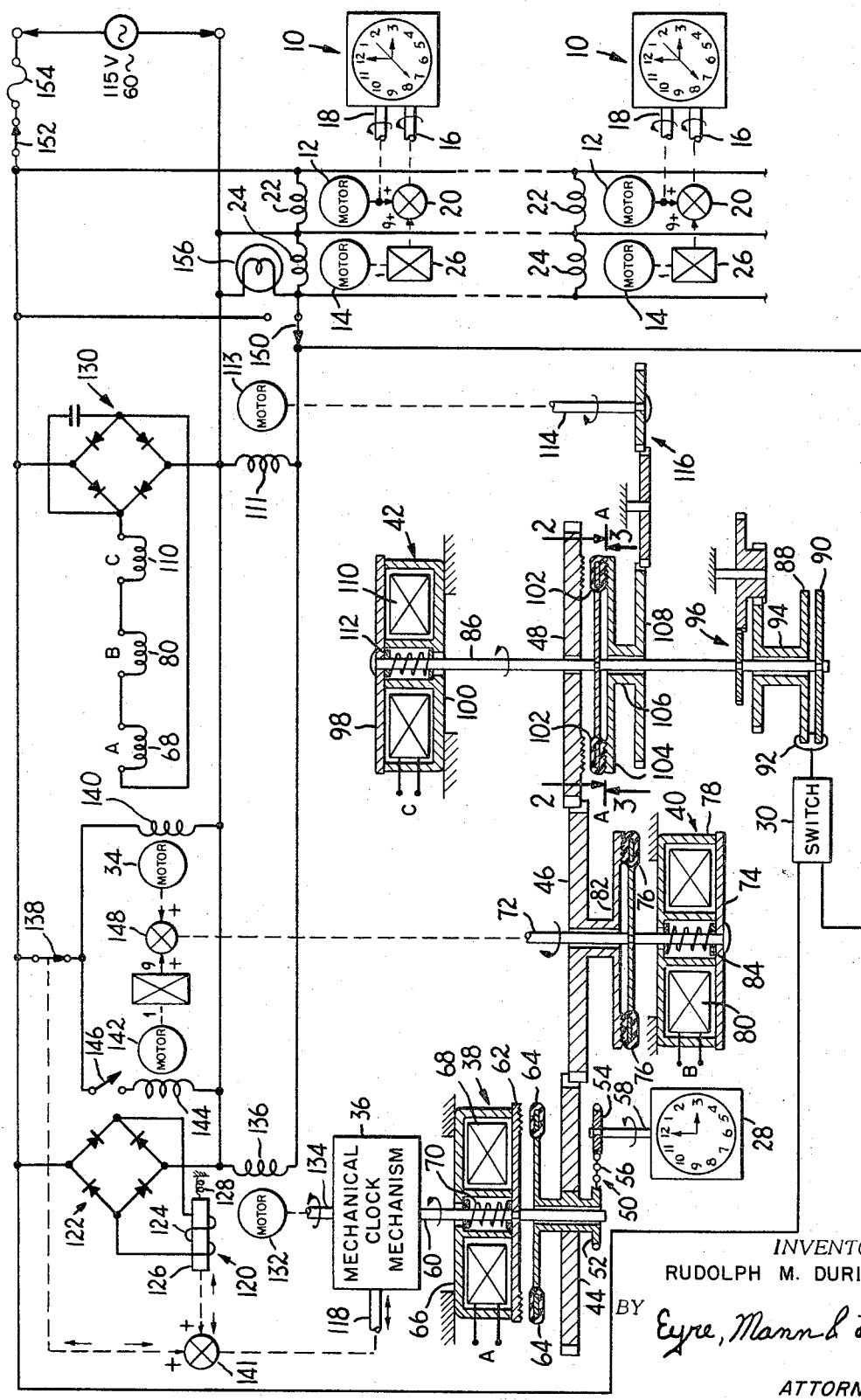
FIGURE 1 is a schematic diagram of the preferred form of the invention.

In the preferred form of the invention, the minute and hour hands of each of the electric clocks 10 of the system are connected to two synchronous motors 12 and 14 through a shaft 16 while the second hand of each of the electric clocks 10 is connected to only one of the two motors, motor 12, through a shaft 18.

The motors 12 and 14 are identical shaded pole motors with light weight rotors that rotate at 3600 r.p.m. and are geared down for driving the hands of the clock. The motor 12 is geared down 3600 to 1 and coupled to the shaft 16 through differential 20 and to the shaft 18 directly so that the motor 12 turns both the shafts 16 and 18 at one revolution a minute when the motor's field 22 is excited. The motor 14 is geared down 400 to 1 and coupled to the shaft 16 through the differential 20 so that the motor 14 rotates the shaft 16 at nine revolutions a minute when its field 24 is excied. The difference between the gearing of the motors 12 and 14 is represented in FIGURE 1 by gear box 26.

In normal operation of the electric clocks 10, the field 22 of motor 12 is connected across the 115 volt 60 cycle line while the field 24 is kept open to keep the motor 14 unenergized. However, when the electric clocks 10 are slow, the field 24 can be connected in parallel with the field 22 across the 115 volt 60 cycle line so that the electric clocks will run at ten times their normal speed until the electric clocks again indicate the correct time.

The present invention provides a new master clock and clock error correction system to be used with the above electric clocks 10 to keep the correct time on a master clock during interruptions of the electrical power and to automatically restore the electric clocks 10 to the correct time after the resumption of electrical power.

This master clock and error correction system has a master clock face 28 for displaying the correct time at all times and, has a normally open switch 30 to connect the windings 24 for the motors 16 across the 115 volt 60 cycle line to correct the electric clocks 10 when they are slow.

During normal operation of the electric clocks 10, the hands on the master clock face 28 are driven by a synchronous motor 34 which is the same as synchronous motors 12 and 14, of the electric clocks 10. Also, the switch 30 is open to keep the motors 14 of the electric clocks 10 stationary. When the current to the electric clocks 10 is interrupted, the hands of the master clock face 28 are driven by a mechanical clock movement 36. When the current is restored to the electric clocks 10 after the interruption, the synchronous motor 34 again drives the hands on the master clock face 28, and the switch 30 is closed so that the motors 12 and 14 drive the hands of the system clocks together at ten times their normal rate to make up the error which occurred during the power interruption. After the hands of the system clocks 10 indicate the correct time again, the switch 30 is opened to return the system to normal operation.

The transfer of the drive for the hands of master clock face 28 between the synchronous motor 34 and the mechanical clock movement 36 and the opening and closing of the switch 30, is accomplished by a unique mechanism employing three meshed gears 44, 46 and 48 and three electromagnetic clutches 38, 40 and 42 which are energized while current is supplied to the electric clocks 10 and are deenergized when the current supplied to the electric clocks is interrupted.

The first meshed gear 44 drives the hands of the master clock face 28 through chain drive 50 having two sprockets 52 and 54 and a drive chain 56. One sprocket is centrally mounted on the gear 44 for rotation therewith. The other sprocket 54 is mounted on the drive shaft 58 of the hands of the master clock face 28. The chain 56 meshes with the two sprockets 52 and 54 to transmit the movement of the gear 44 to the shaft 58 to drive the hands of the master clock face 28.

The first meshed gear 44 is coaxially mounted around the output shaft 60 of the mechanical clock movement 36 and is free to rotate with respect to said shaft 60 during normal operation of the electric clocks 10. However, during periods in which the electrical power is cut off from the electric clocks 10, the gear 44 is fixed to the mechanical clock movement's output shaft 60 to transmit the rotation of the shaft 60 to the drive shaft 58 for the hands of the master clock face 28.

To couple and uncouple the shaft 60 to and from the gear 44, the first magnetic clutch 38 is employed. The magnetic clutch 38 has a paramagnetic plate 62 which is fixed to the shaft 60 and has clutching surfaces 64 fixed to the first meshed gear 44.

While current is being supplied to run the electric clocks 10, the plate 62 is held out of engagement with the clutching surfaces 64 and against the paramagnetic frame 66 of the clutch by the magnetic field set up in the paramagnetic frame by the energized coil 68 of the clutch. This leaves the first meshed gear 44 free to rotate with respect to the shaft 60 while, as shall be seen hereafter, the first meshed gear 44 is being driven through the second meshed gear 46 by the synchronous motor 34.

When the current to the electric clocks 10 fails, the coil 68 is deenergized and releases the plate 62 allowing a spring 70 positioned between the paramagnetic frame 66 and the plate 62 to force the plate 62 into engagement with the clutching surfaces 64. This fixes the output shaft 60 of the mechanical clock mechanism 36 to the first meshed gear 44 so that the mechanical clock mechanism will drive the first meshed gear 44 and, through the first meshed gear 44, the hands of the master clock face 28.

While electric current is being supplied to run the electric clocks 10, the synchronous motor 34 drives the first meshed gear 44 through the second meshed gear 46. A shaft 72 connected to the synchronous motor 34 passes axially through the second meshed gear 46 and, on the other side of the second meshed gear 46, is fixed to a paramagnetic plate 74 facing the second electromagnetic clutch 40. Also, fixed on the shaft 72 are the clutching surfaces 76 of the clutch.

While current is supplied to run the electric clocks 10, the magnetic field set up in the paramagnetic frame 78 of the clutch 40 by the coil 80 mounted within the frame draws the plate 74 to the frame 78. This causes the shaft 72 to move along its axis and bring the clutching surfaces 76 in contact with a disc 82 coaxially fixed to the second meshed gear 46. Therefore, when power is on, the synchronous motor 34 drives the hands of the master clock face 28 through shaft 72, the clutching surfaces 76, the plate 82, the second meshed gear 46, the first meshed gear 44, and the chain drive 50.

When there is an interruption in the current to the electric clocks 10, the coil 80 of the second clutch 40 is deenergized allowing a spring 84 mounted between the frame 78 and the plate 74 to force the plate 74 away from the frame 78. This disengages the clutching surfaces 76 from the disc 82 permitting the second meshed gear 46 to rotate freely of the synchronous motor 34 while the first meshed gear 44 is being driven by the mechanical clock movement 36.

In addition to meshing with the first meshed gear 44; the second meshed gear 46 also meshes with the third meshed gear 48 to transmit the rotation of the first meshed gear 44 to the third meshed gear 48. The third meshed gear is mounted coaxially on the shaft 86 of two cams 88 and 90 which control the opening and closing of the switch 30. The switch 30 is connected in between the 115 volt 60 cycle line and the fields 24 of the synchronous motors 14 for the electric clocks 10 so that when the switch 30 is closed the synchronous motors 12 and 14 together drive the hands of the systems clocks 10 at ten times their normal speed.

The cams 88 and 90 are circular cams each having a single detent therein. A cam follower 92 is fixed to the switch 30 and rides on the periphery of the cams 88 and 90 as they rotate. When the cam follower 92 rides on the periphery of either cam 88 or 90 it holds switch 30 closed allowing current to reach the coils 24 of the synchronous motors 14. When the cam follower 92 is simultaneously positioned in the detents of both the cams 88 and 90, the circuit between the 115 volt 60 cycle line and the coils 24 of the motor 14 is opened by the switch preventing current from reaching the coils 24.

One of the cams 90 is fixed coaxially to the shaft 86 so that it rotates directly with the shaft 86. The other of the cams 88 is positioned on a sleeve 94 mounted on the shaft and is therefore free to rotate with respect to the shaft 86. This second cam 88 is driven through a gear train 96 by the shaft 86 so that it rotates at $\frac{1}{12}$ the speed of the cam 90. Therefore, the cams 88 and 90 rotate in the same relation as the minute and hour hands of the clock, that is, cam 88 makes one revolution for every 12 revolutions of the cam 90.

Fixed to the cam shafts 86 is a paramagnetic plate 98 which faces the paramagnetic frame 100 of the third electro-magnetic clutch 42. Also fixed to the cam shaft 86 are clutching surfaces 102 which face in opposite directions towards the third meshed gear 48 and a plate 104 axially fixed to a sleeve 106 on which is mounted another gear 108. When the coil 110 of the clutch 42 is deenergized, a spring 112 mounted between the paramagnetic frame 100 and the plate 98 forces the plate 98 away from the frame 100. This brings the clutching surfaces into contact with the third meshed gear 48 so that the third meshed gear 48 drives the shaft 86. Since all the clutches are deenergized at the same time, this means the mechanical clock movement 36 will drive the shaft 86 through the plate 62, the clutching surfaces 64, the three meshed gears 44, 46 and 48, and the clutching surfaces 102. The mechanical clock mechanism 36 therefore causes the cams 88 and 90 to be rotated clockwise. As will be shown later, the cams are normally positioned so that the cam follower 92 is in the detents of both the cams 88 and 90. When the mechanical clock rotates the cams, they will be rotated away from this detent position, the cam 90 at one revolution an hour and the cam 88 at one revolution every 12 hours. Therefore, the position of the detents of the cams with respect to the cam follower is proportional to the time that has elapsed while the mechanical clock movement is driving the cams which, of course, is the length of time of a power failure since the only time the mechanical clock movement 38 drives anything is when the power has failed or is purposely cut off.

When power is returned, the coil 110 of the third clutch 42 is energized setting up a magnetic field in paramagnetic frame 100. This draws the plate 98 into contact with the frame 100 thus positioning the clutching surfaces 102 out of contact with the third meshing gear 48 and into contact with the disc 104.

With the clutching surfaces 102 out of contact with third meshed gear 48, the cams 88 and 90 stop, having rotated to a position which indicates the total amount of time which elapsed while the power was off. In this position of the cams the switch 30 is closed except, of course, if the length of the power failure happens to be 12 hours or multiples thereof. With the switch 30 closed, current is fed to the windings 24 of the electric clocks 10 to drive the electric clocks 10 at ten times their normal speed as outlined above.

At the same time current is fed through the switch 30 to the coil 111 of a synchronous motor 113. The output shaft 114 of this synchronous motor 113 is coupled by a gear train 116 to the gear 108 fixed to the disc 104 so that the gear 108 is driven by the synchronous motor 113. Since the gear 108 is fixed to the cam shaft 86 by the clutching surfaces 102 when power is on, this means the cams 88 and 90 are also driven by the synchronous motor 113.

The gear train 116 is selected so that the synchronous motor 113 drives the cams 88 and 90 at nine times their normal speed in a counterclockwise direction. Therefore, when the synchronous motor 14 has driven the hands of the systems clocks 10 so that they again read the correct time, the synchronous motor 113 will have driven the cams 88 and 90 to their normal position, that is, with the cam follower 92 in both the detents. This opens the switch 30 stopping the flow of current to the synchronous motor 113 and to the synchronous motors 14. Therefore, the hands of the systems clocks 10 again start keeping the correct time and the cams 88 and 90 remain in their normal position until there is another power failure.

Up until now, in the above description, mechanical clock movement 36 has been described as if it runs all the time. If this was the case there would be serious problems with wear of the mechanical clock movement and the winding of the mechanical clock movement. The mechanical clock movement in fact is stopped while the electric power is on and is only wound when the electric clocks 10 are being corrected after an electric power stoppage.

The stopping and starting of the mechanical clock movement 36 is accomplished by moving the end of a flexible shaft 118 in and out of contact with the spokes of the main wheel of the escapement mechanism of the mechanical clock movement 36 to respectively stop and start the mechanical clock movement 36. The flexible shaft 118 is moved by a solenoid actuated mechanism 120. When power is on, a rectifying bridge circuit 122, connected across the 115 volt 60 cycle line for the electric clocks 10, supplies current to the coil 124 of the solenoid. This sets up a magnetic field which draws the paramagnetic armature 126 of the solenoid into the energized coil 124 forcing the flexible shaft 118 in between the spokes of the main wheel of the escapement mechanism of the mechanical clock movement 36 thereby keeping the mechanical clock movement 36 stationary. When power fails, the supply of current to the coil 124, of course, stops. This dissipates the magnetic field set up by the coil 124 and permits a spring 128, to pull the core 126 partially out of the coil 124 thereby removing the end of the flexible shaft 118 from between the spokes of the main wheel of the mechanical clock movement's escapement mechanism allowing the mechanical clock movement 36 to operate.

Like the solenoid 120 the coils 68, 80 and 110 of the electromagnetic clutches 38, 40 and 42 are energized by a rectifying bridge circuit 130 connected across the 115 volt 60 cycle line for the system clocks 10. When power is on, the D.C. supply 130 feeds current in series through each of the coils 68, 80 and 110 to keep the clutches energized. When power fails, the D.C. supply 130 can no longer supply the coils with electric current and the clutches become deenergized. Therefore, energization and deenergization of the coils 68, 80 and 110 and the solenoid 120 occur simultaneously so that when power fails the mechanical clock movement starts operating at the same time its output shaft 60 is engaged to drive the first meshed gear 44, and when power returns, the mechanical clock movement 36 stops operating at the same time its output shaft 60 is uncoupled from the first meshed gear 44.

While the mechanical clock movement is driving the hands of the master clock face 28 and driving the cams 88 and 90, its mainspring is unwinding. Eventually the mechanical clock mechanism would stop if its mainspring were allowed to unwind completely. Therefore, the mainspring must be wound periodically to be sure the mechanical clock mechanism never runs down. For this purpose, a synchronous motor 132, is employed. The output shaft 134 of the motor 132 is connected to the winding mechanism of the mechanical clock movement 36 and the coil 136 of the motor 134 is connected in shunt with the field coil 111 of the synchronous motor 113 which drives the cams 88 and 90.

When the synchronous motor 113 drives the cams 88 and 90 with the resumption of power, the synchronous motor 132 winds the main spring of the mechanical clock movement 36. The motor 132 is geared to the winding mechanism of the clock so that it will have fully wound the main spring of the clock when the synchronous motor 113 drives the detents of the cams under the cam follower 92 to cut off the supply of current to the windings of both the synchronous motors 113 and 132 to stop both motors.

At times, it is desirable that the master clock and downtime accumulator system be turned off for repairs while the electric clocks 10 continue to keep the correct time. For this purpose a switch 138 is provided to break the connection between 115 volt 60 cycle line and the coil 140 of the synchronous motor 34. In such a case, it is undesirable to have the mechanical clock movement 36 operating since this would interfere with the repairs. To prevent operation of the mechanical clock mechanism 36 at that time, the switch 138 is mechanically linked through a linkage 141 to the flexible shaft 118 so as to prevent the end of the flexible shaft 118 from being removed from between the spokes of the main wheel in the escapement mechanism of mechanical clock movement 36 when the switch 138 is open.

After the opening of switch 138, and at other times, it is necessary to correct the hands of the master clock face 28. To do this a second synchronous motor 142 is provided for driving the hands of the master clock face 28. The coil 144 of this motor is connected in series with the normally closed switch 138 and a normally open switch 146 across the 115 volt 60 cycle line. When the switch 146 is closed both the synchronous motors 34 and 142 drive the hands of the master clock face 28 through a differential 148. Like in the case of the electric clocks 10, with both synchronous motors 12 and 14 driving the hands of the master clock face 28 the hands move at ten times their normal rate to make up any error which may exist. When the hands of the master clock face 128 again read the correct time the switch 146 is opened manually, thus cutting off current flow through the coil 144 to stop the motor 142 so that thereafter the hands of the master clock face 28 are driven at the normal rate by synchronous motor 34.

When the systems clocks 10 cannot be corrected by the downtime accumulator they may be corrected manually by a switch 150. Positioning the switch 150 in its normally open position connects the coils 24 of the motors 16 directly across the 115 volt 60 cycle source of excitation bypassing the control switches 30 and 32 of the downtime accumulator. The systems clocks 10 will thereby run at ten times normal speed irrespective of the position of the cams 88 and 90 until the switch 150 is again positioned back into its normal position.

All the electrical motors in the clocks can be turned off by the main power switch 152 when it is desirable. However, with the main power switch open, the mechanical clock movement 36 will cause the cams 88 and 92 to accumulate downtime and will keep the hands of the master clock face 28 indicating the correct time unless the switch 138 is also opened to keep the mechanical clock movement stationary.

If there is a short in the system, the fuse 154 will blow. This, of course, will cut off electricity to all the synchronous motors in the system as does opening the master power switch 154. But, here again, the mechanical clock movement will accumulate downtime on the cams 88 and 90 and will drive the hands of the master clock face to keep them reading the correct time.

A dial light 156 is connected in shunt with the coil 24 of the synchronous motors 14 so that it will light when the electric clocks 10 are being accelerated.

Figure 2:
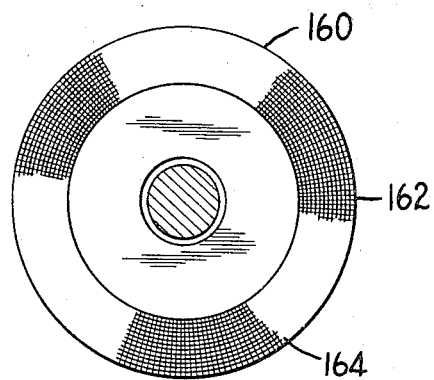
FIGURE 2 is the clutch plate with the radial grooves.
Figure 3:
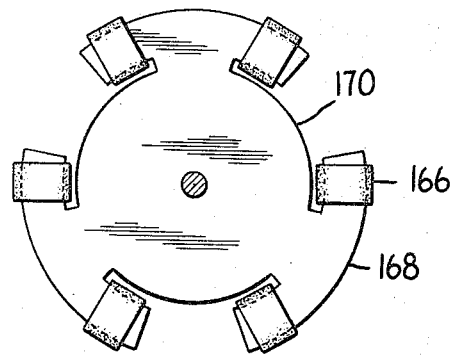
FIGURE 3 is the clutch plate with the soft rubber sleeves.

In the above system, it is very important that the clutches used in the system operate correctly and that they use very little power. Though many clutches may be used the preferred type of clutch is shown in FIGURES 2 and 3. In these figures, a clutch plate 160 such as the third meshed gear 48 or the disc 102, is provided with a series of grooves 162, completely around its periphery, which are radial with respect to the axis of rotation for the plate 160. These radial grooves are numerous and are quite closely positioned as shown in the figure.

Preferably, the clutch plate 160 also has a number of circular grooves 164 which are concentric with the axis of rotation of the plate 160 and are positioned so that the radial and circular grooves intersect to divide the peripherial section of the clutch plate into a series of perfect ring segments.

To engage the clutch plate for the transferral of motion a number of soft rubber surfaces 166 are provided. These soft rubber surfaces 166 are bands of rubber positioned on arms 168 extending from a plate 170. Also, the portions of the arms 168 about which the bands 166 are wrapped are each locally deflectable, that is to say, independently of all the other portions, in order to accommodate misalignment or unevenness in the alignment of the arms.

In an operative clutch, such as the clutches illustrated in FIGURE 1, the surfaces shown in FIGURE 2 and FIGURE 3 face each other and are engaged and disengaged. When they are engaged, the soft rubber surfaces 166 are positioned against the portion of the clutch plate 170 covered with the ring segments. Soft rubber and ring segments have been found to provide a tremendous grab even when light-weight springs and small coils are used. It is preferable that the grooves or ridges of the ring segments be truly radial from and circular with the axis of rotation of the plate. Otherwise the plates will move with respect to each other when they are engaged or disengaged. Such movement introduces errors which must be avoided.

Above, the preferred embodiment of the present invention has been described. It will be understood that the present invention is not limited to this embodiment. Therefore, it will be understood that this is intended to cover all changes and modifications of the invention herein chosen for the purpose of illustration which do not constitute departures from the spirit and scope of the invention.

What is claimed is:
1. In a light weight electromagnetic clutch of the type which is used in clock systems for switching between electric and mechanical drive means and which has two rotatable members that can be positioned together to transmit rotary motion from one member to the other and can be positioned apart so that either member can be rotated independently of the other, the improvement which comprises:
   (a) a surface on the first of the members with a multiplicity of rigid grooves which are radial with respect to the axis of rotation of said first member and which lie generally in a common plane; and
   (b) a plurality of spaced resilient members on the second of the two members, said resilient members having substantially flat surfaces which face the grooves of said first member and which also lie generally in a common plane whereby the area of said facing surfaces engages a corresponding area of the grooves of the first member substantially simultaneously when the two members are positioned together to transmit motion between the two members.

2. The structures of claim 1 wherein said surface on the first of the members also has a multiplicity of closely spaced circular grooves which intersect said straight grooves and whose center is on the axis of rotation of said first member.

3. The structure of claim 1 wherein said spaced resilient members are soft elastomeric sleeves positioned around arms extending from said second member.

4. The structure of claim 3 wherein each said arm is locally deflectable with respect to the other arms so as to accommodate misalignments between the two members and unevenness of said surface.

References Cited
UNITED STATES PATENTS

| | | | |
|---|---|---|---|
| 1,622,261 | 3/1927 | Payne. | |
| 2,180,086 | 11/1939 | Kraft | 192—107 |
| 2,217,529 | 10/1940 | Spase | 192—107 X |
| 2,299,028 | 10/1942 | Nutt et al. | 192—107 |
| 3,073,424 | 1/1963 | Russell | 192—107 X |
| 3,096,863 | 7/1963 | Shefke | 192—84 X |
| 3,233,710 | 2/1966 | Daniels | 192—84 |
| 3,272,290 | 9/1966 | Goddard | 192—84 X |

MARK NEWMAN, *Primary Examiner.*

ARTHUR T. McKEON, *Examiner.*